United States Patent [19]
Reinhardt et al.

[11] Patent Number: 5,988,204
[45] Date of Patent: Nov. 23, 1999

[54] ADJUSTABLE FLUID FLOW REGULATOR

[75] Inventors: Paul E. Reinhardt, High Ridge; Thomas P. Buescher; Timothy E. Reitz, both of St. Louis, all of Mo.; Wayne A. Koopman, Red Bud, Ill.

[73] Assignee: Emerson Electric Co., St. Louis, Mo.

[21] Appl. No.: 09/013,354

[22] Filed: Jan. 26, 1998

[51] Int. Cl.⁶ .................................................. G05D 16/06
[52] U.S. Cl. .................. 137/271; 137/505; 137/505.41; 251/337
[58] Field of Search .................. 137/270, 271, 137/505, 505.41; 251/337

[56] References Cited

U.S. PATENT DOCUMENTS

| | | |
|---|---|---|
| 383,024 | 5/1888 | Stork . |
| 1,734,527 | 11/1929 | Mueller . |
| 1,939,912 | 12/1933 | McNeal ................................ 251/337 |
| 2,007,805 | 7/1935 | Lippert et al. . |
| 3,128,086 | 4/1964 | Wolfhope . |
| 3,338,264 | 8/1967 | Dykzeul et al. .................... 137/505.41 |
| 3,405,927 | 9/1968 | Drabik et al. .................. 137/505.41 X |
| 3,451,421 | 6/1969 | Vincenzi et al. ......................... 137/495 |
| 3,603,214 | 9/1971 | Murrell ........................... 137/505.41 X |
| 3,747,629 | 7/1973 | Bauman .................................... 137/270 |
| 3,825,029 | 7/1974 | Genbauffe ....................... 137/505.41 X |
| 3,915,335 | 10/1975 | Shanklin et al. . |
| 3,938,542 | 2/1976 | Bolha ............................. 137/505.41 X |
| 5,176,269 | 1/1993 | Herman . |
| 5,284,239 | 2/1994 | Kiricoples . |
| 5,381,819 | 1/1995 | Gotthelf . |
| 5,435,343 | 7/1995 | Buezis . |

*Primary Examiner*—Stephen M. Hepperle
*Attorney, Agent, or Firm*—Howell & Haferkamp, L.C.

[57] ABSTRACT

An adjustable fluid flow regulator that can be adjusted for operating at two different operating pressures includes a casing having a chamber therein, an inlet and an outlet communicating with the chamber, and a valve for controlling fluid flow between the inlet and the outlet. A flexible diaphragm in the casing is connected to the valve for operating the valve in response to pressure changes in the chamber. The fluid flow regulator further includes a spring, a removable hollow cap aligned with the spring, and a link adapted to fit in the cap. The link, when installed in the cap, engages the spring to cause the spring to apply a biasing force against the diaphragm that is higher than when the link is not in the cap. According to the method of this invention, the adjustable fluid flow regulator is adjusted for use at two different operating pressures by installing or removing the link from the hollow, removable cap.

16 Claims, 6 Drawing Sheets

ADJUSTABLE FLUID FLOW REGULATOR

FIELD OF THE INVENTION

This invention relates to an adjustable fluid regulator, and in particular to an adjustable fluid flow regulator that can be adjusted for use with natural or liquid petroleum (L.P.) gas.

BACKGROUND OF THE INVENTION

Natural gas and L.P. gas are each frequently used in commercial and residential settings. Rather than having equipment that is limited in use to just one type of gas, it is desirable to have equipment that can be used with both types of gas, or at least which can be quickly and safely converted for use with each type of gas. Because natural gas and L.P. gas are typically delivered at different pressures, a number of attempts have been made to make a pressure regulator that is capable of operating in the different pressure ranges typical for the two types of gas. Examples of these attempts include Wolfehope, U.S. Pat. No. 3,128,086; Vicenzi et al., U.S. Pat. No. 3,451,421; Dykzeul et al., U.S. Pat. No. 3,338,264; Bauman U.S. Pat. No. 3,747,629; Murrell, U.S. Pat. No. 3,603,214; Gotthelf, U.S. Pat. No. 5,381,819; Buezis, U.S. Pat. No. 5,435,343. Most of these devices employ a diaphragm member for controlling a valve, and a spring which does not bias the diaphragm during operation at a first pressure, but which is manipulated in some way to engage and thus bias the diaphragm during operation at a second pressure. For example, in Bauman, U.S. Pat. No. 3,747,629, a conversion member is attached in one way so as not to engage a spring and is flipped over and attached another way so as to bias the spring. While of simple construction, this type of device presents the risk that the conversion member can be installed incorrectly.

The principal difficulties with the prior adjustable fluid flow regulators has either been the complexity of their construction and operation, or the risk that the regulator could be inadvertently switched from one mode of operation to the other, which poses the risk of appliance failure.

SUMMARY OF THE INVENTION

The present invention relates to an adjustable fluid flow regulator construction that is simple and inexpensive, and one that is easy to convert between the two modes of operation, but which resists accidental or inadvertent conversion. Generally the regulator of the present invention comprises a casing having a chamber therein, and an inlet and an outlet communicating with the chamber. There is a valve in the casing for controlling fluid flow between the inlet and the outlet. A flexible diaphragm in the casing, connected to the valve, operates the valve in response to pressure changes in the chamber. A passage extends through the casing, and is closed with a removable hollow vent cap that vents air from one side of the diaphragm to allow the diaphragm to move freely in response to pressure changes on the other side of diaphragm.

The adjustable fluid flow regulator further comprises a spring for selectively applying biasing pressure against the diaphragm, to adjust the operating pressure of the diaphragm. This spring extends into the passage. A removable link is adapted to fit in the hollow vent cap for selectively engaging the spring to cause the spring to apply a biasing force against the diaphragm when the link is in the cap. The spring extends into the hollow cap when the link is not in the cap so that it provides lesser or no biasing force to the diaphragm.

Thus, the operating pressure of the diaphragm can be adjusted by installing or removing the removable link in the hollow cap. This allows the regulator to be quickly, easily adjusted between two different operating pressures, for example the operating pressures for natural gas and for L.P. gas. The conversion is also relatively fool-proof, since it is effected by the installation or removal of the link from the cap, rather than the operation of levers or switches that can be inadvertently operated, or the use of a reversible member that can be installed incorrectly.

These and other features and advantages will be in part apparent, and in part pointed out hereinafter.

BRIEF DESCRIPTION OF THE DRAWINGS

Corresponding reference numerals indicate corresponding parts throughout the drawings.

DETAILED DESCRIPTION OF THE PREFERRED EMBODIMENTS

Figure 1:
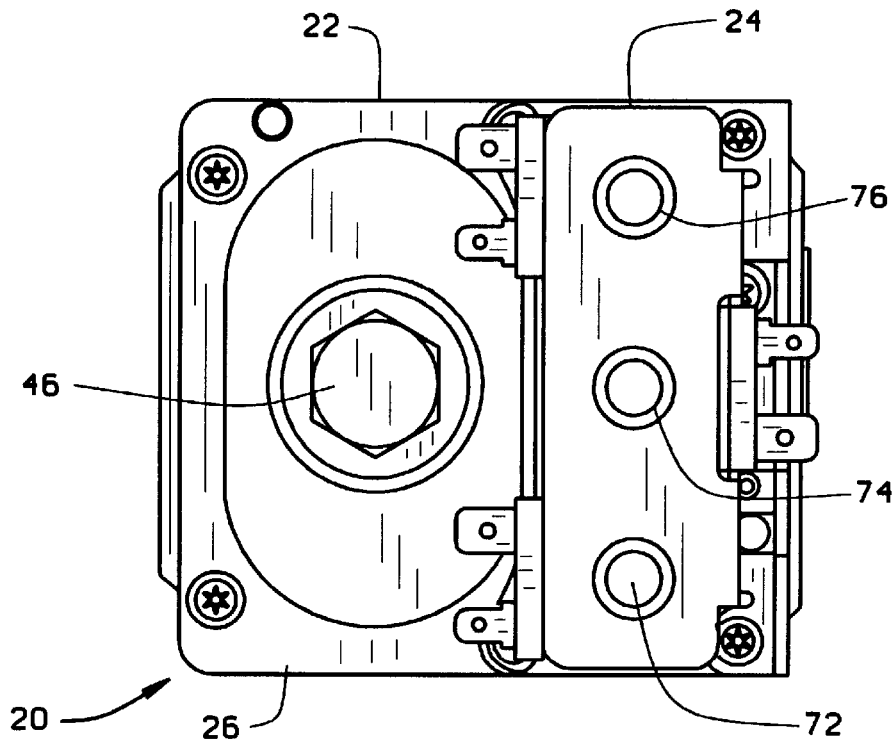
FIG. 1 is a top plan view of a gas valve unit incorporating an adjustable fluid flow regulator constructed according to the principles of this invention.
Figure 2:
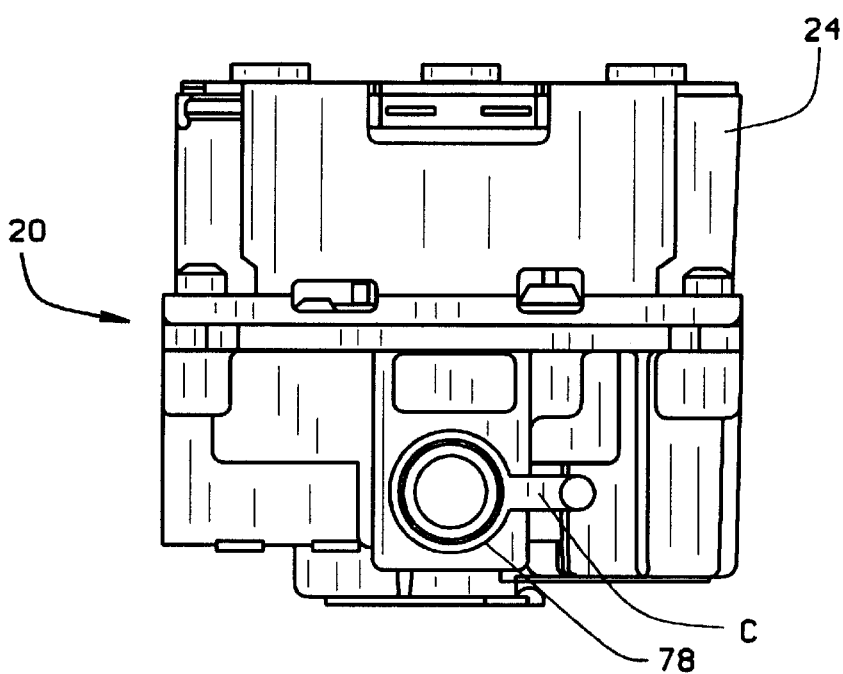
FIG. 2 is right side elevation view of the gas valve unit.
Figure 3:
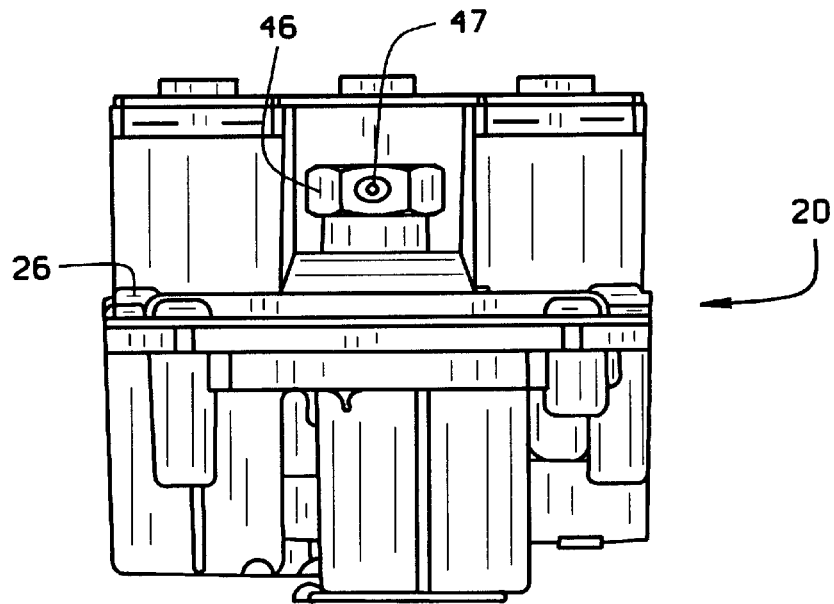
FIG. 3 is a left side elevation view of the gas valve unit.
Figure 4:
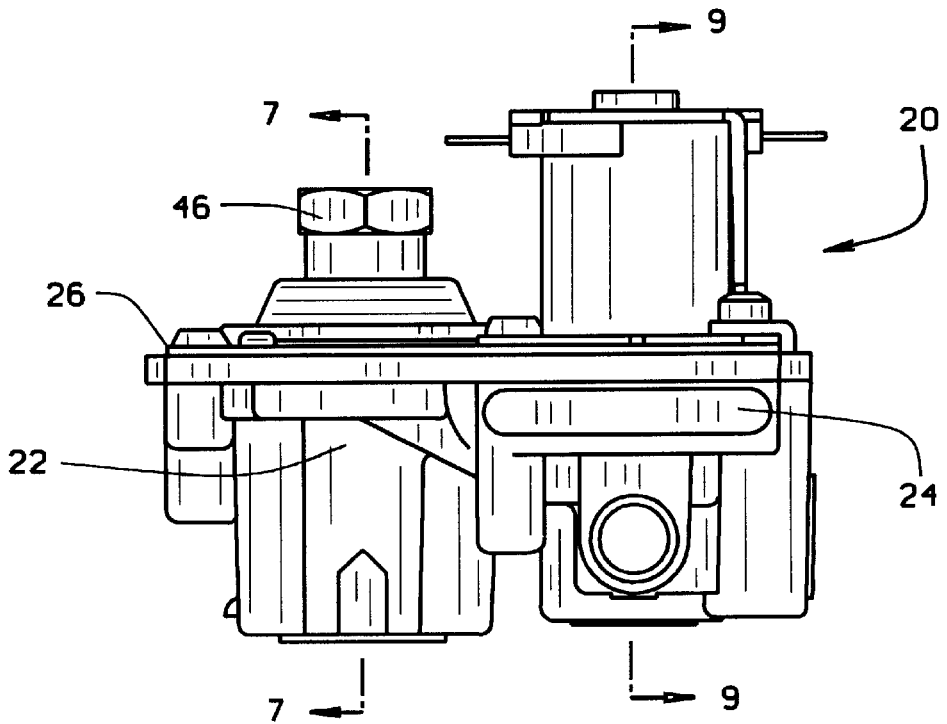
FIG. 4 is a front elevation view of the gas valve unit.
Figure 5:
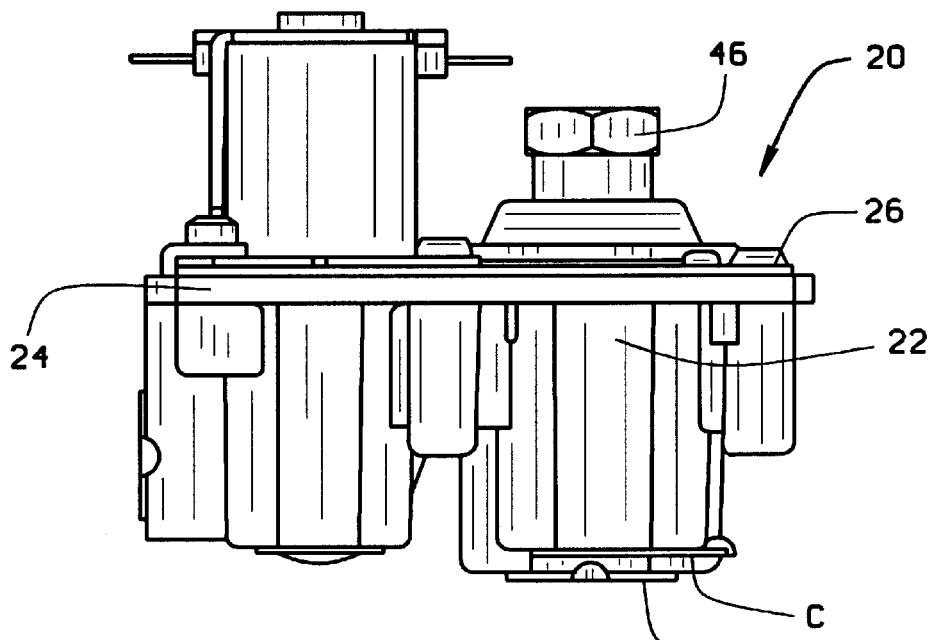
FIG. 5 is a rear elevation view of the gas valve unit.

A gas valve unit incorporating an adjustable fluid flow regulator according to the principles of this invention is indicated generally as 20 in FIGS. 1–6. The valve unit 20 is of the type that might be incorporated into a gas range to provide gas to the burners on a cook top, an oven burner, and a broiler burner. However, the adjustable fluid flow regulator of the present invention is not so limited, and can be incorporated into devices for distributing gas to other gas appliances.

The gas valve unit 20 has an adjustable flow regulator section 22 on the left side, and a valve section 24 on the right side. The adjustable flow regulator section 22 comprises a casing 26 having a chamber 28 therein. An inlet 30 (FIG. 6) and an outlet 32 (FIG. 6) communicate with the chamber 28. A valve 34 (FIGS. 7A and 7B) is in the chamber for controlling fluid flow between the inlet 30 and the outlet 32. The valve 34 comprises an annular valve seat 36, and a valve stem 38 adapted to interfit with the valve seat to close the path between the inlet 30 and the outlet 32.

There is a flexible diaphragm 40 in the casing 26, connected to the valve 34, and particularly to the valve stem 38 for operating the valve in response to pressure changes in the chamber 28 on one side of the diaphragm. The diaphragm 40 flexes in response to changes in the pressure in chamber 28, moving the valve stem 38 with respect to valve seat 36. A first spring 42 extends through a passage 44, with one end engaging an interior wall of the passage and the other end engaging the diaphragm 40 to provide a biasing force against the diaphragm that tends to open the valve 34. The first spring 42 is preferably a coil spring, but some other type of spring or other biasing means could be used.

The passage 44 is closed with a hollow removable vent cap 46. The vent cap 46 comprises a flat top 48 with a depending cylindrical sidewall 50 having an open bottom 52 and external threads 54 that engage internal threads 56 on the outer portion of the passage 44. The vent cap 46 has a vent passage 47 therein that allows air on the side of the diaphragm opposite the valve to vent from the casing as the diaphragm flexes. A second spring 58, generally concentric with the first spring 42, extends through the passage 44. In the preferred embodiment, the spring 58 is a coil spring, having generally conical shape widening from its first end 60 toward its second end 62. The first end 60 of the second spring 58 is mounted over a conical projection 64 on the diaphragm 40. The second end 62 of the second spring 58 extends into the open bottom 52 of the hollow vent cap 46.

Figure 7A:
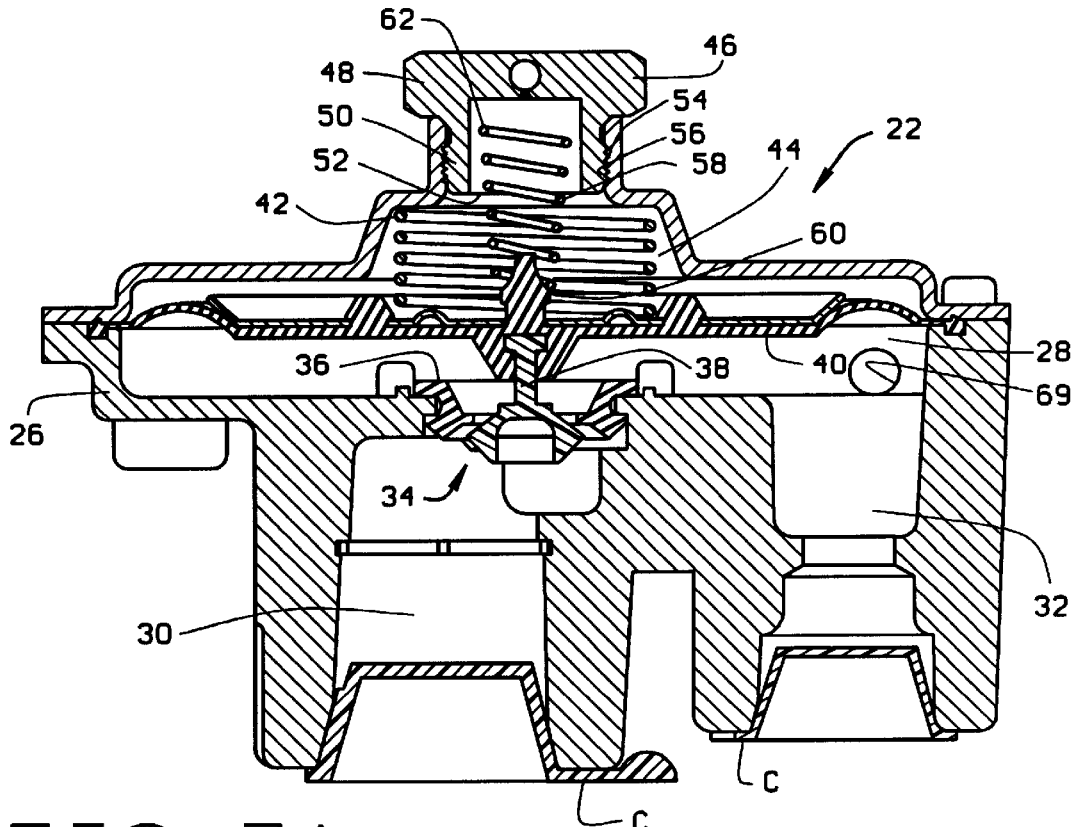
FIG. 7A is a vertical cross sectional view of the gas valve unit taken along the plane of line 7—7 in FIG. 4, showing the adjustable flow regulator without the removable link in the cap.

As shown in FIG. 7A, in the natural gas mode the second end 62 of the second spring 58 is free, and thus the second spring does not apply a biasing force to the diaphragm 40. However, according to the principles of this invention, in the L.P. gas mode a link 64 is installed in the open bottom 52 of the hollow vent cap 46. The link 64 forms a seat in the open bottom 52 of the vent cap 46, that engages the second end 62 of the second spring 58 so that the second spring applies a biasing force on the diaphragm 40, to accommodate the higher operating pressure of L.P. gas.

Figure 6:
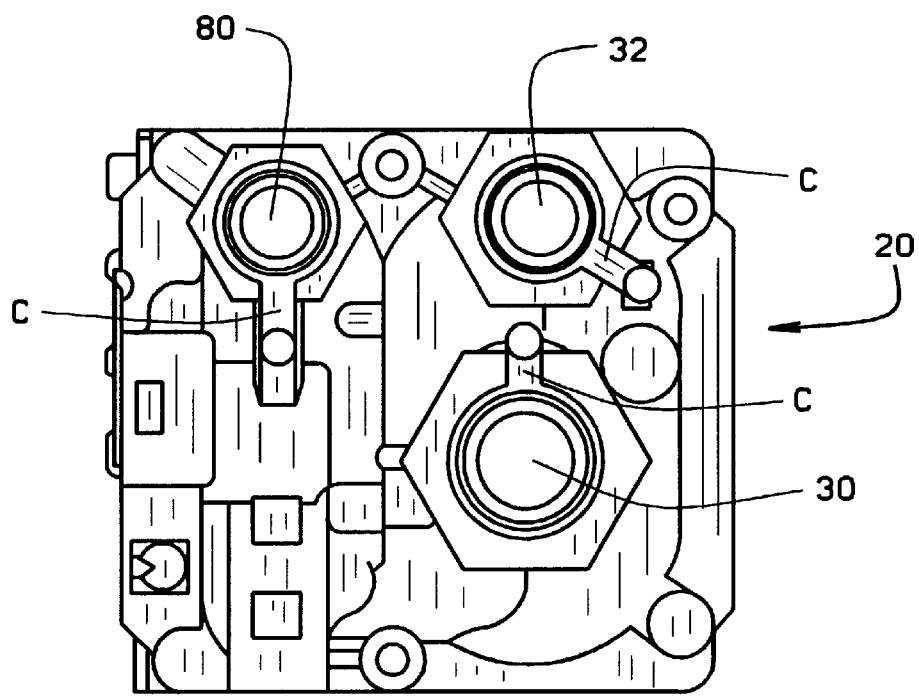
FIG. 6 is a bottom plan view of the gas valve unit.
Figure 7B:
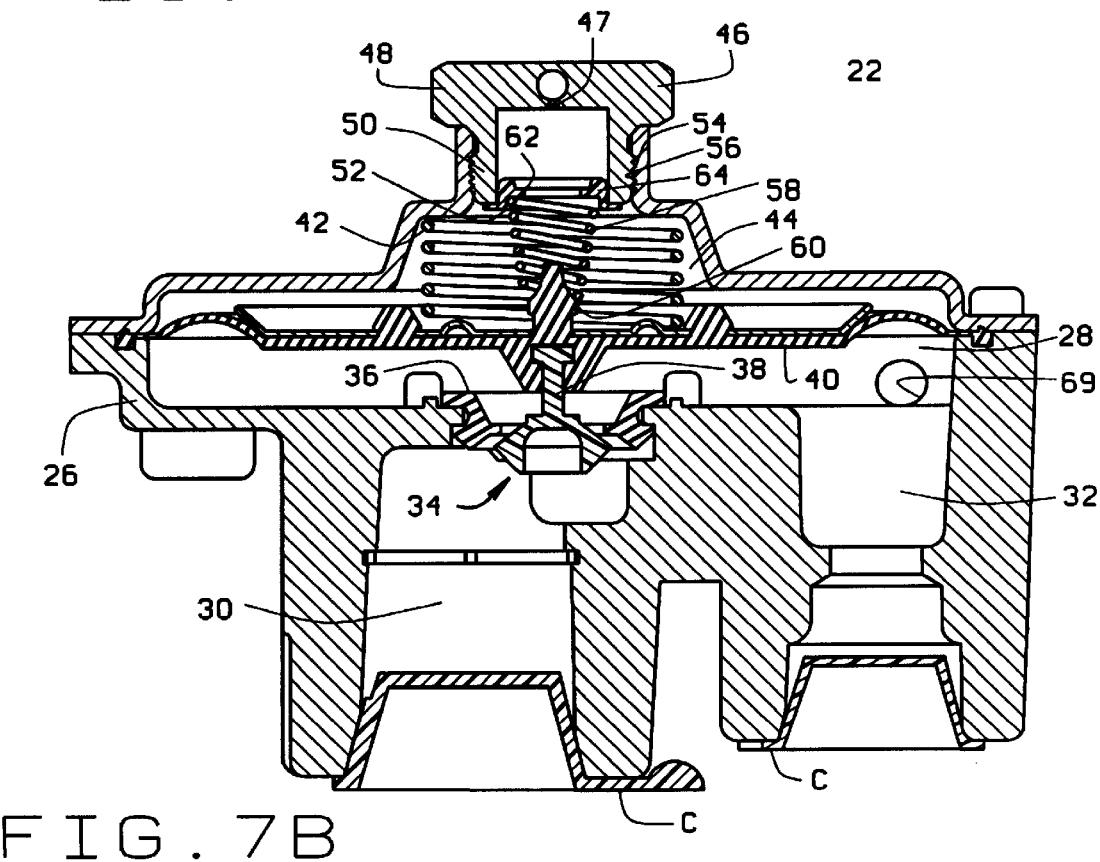
FIG. 7B is a vertical cross-sectional view of the gas valve unit taken along the plane of line 7—7 in FIG. 4, showing the adjustable flow regulator with the removable link in the cap.
Figure 8A:
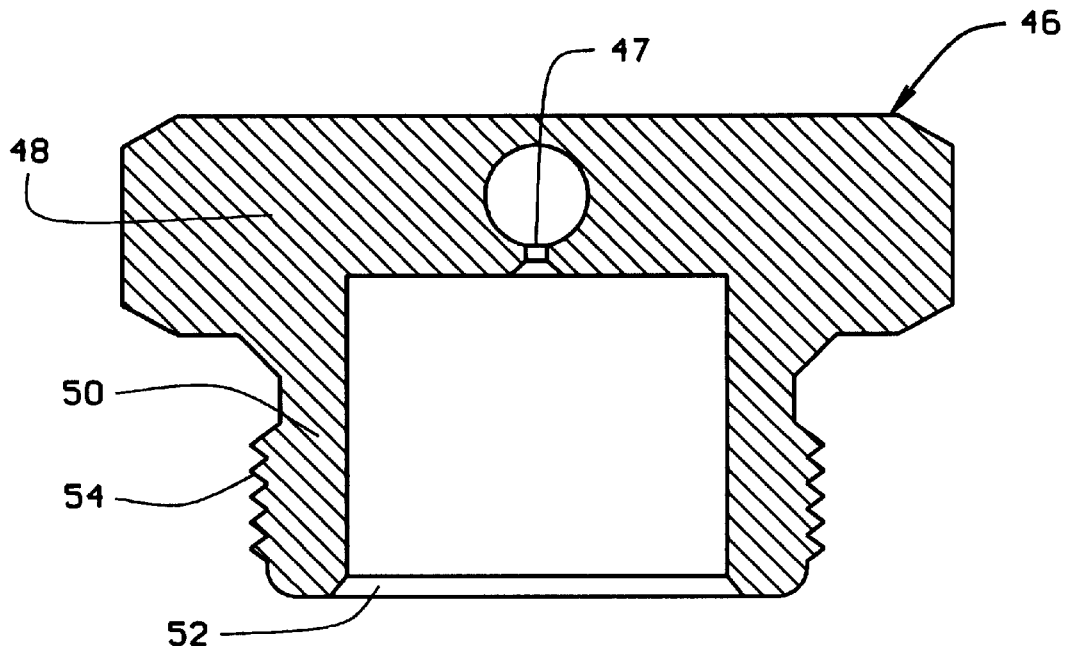
FIG. 8A is an enlarged view of the cap without the removable link.
Figure 8B:
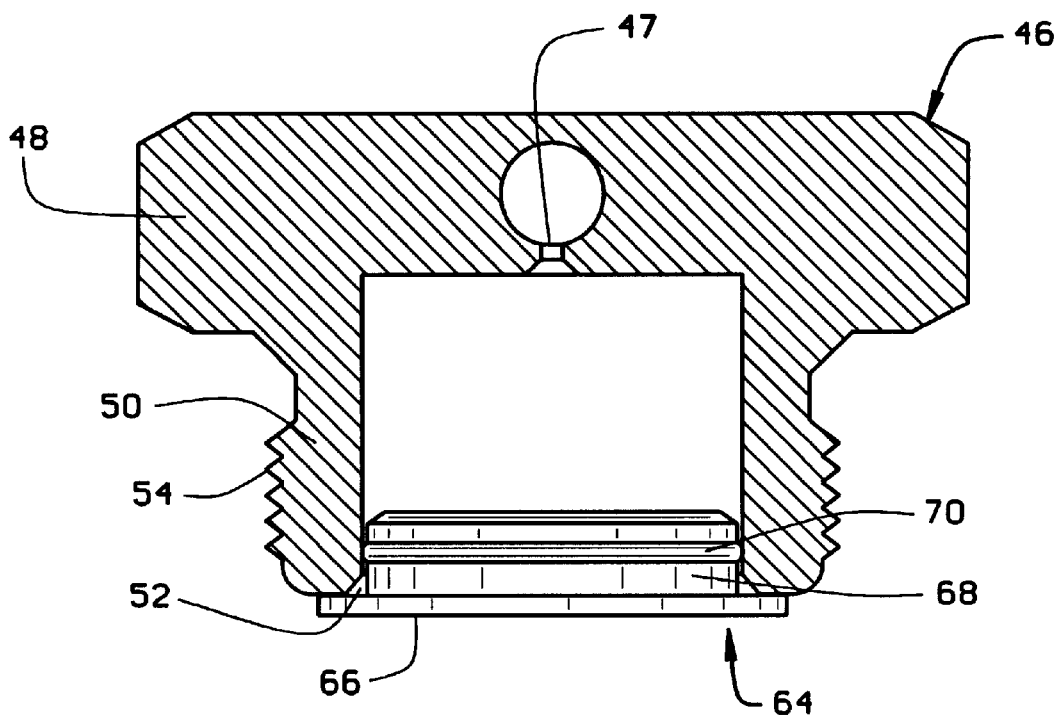
FIG. 8B is an enlarged view of the cap with the removable link.
Figure 9:
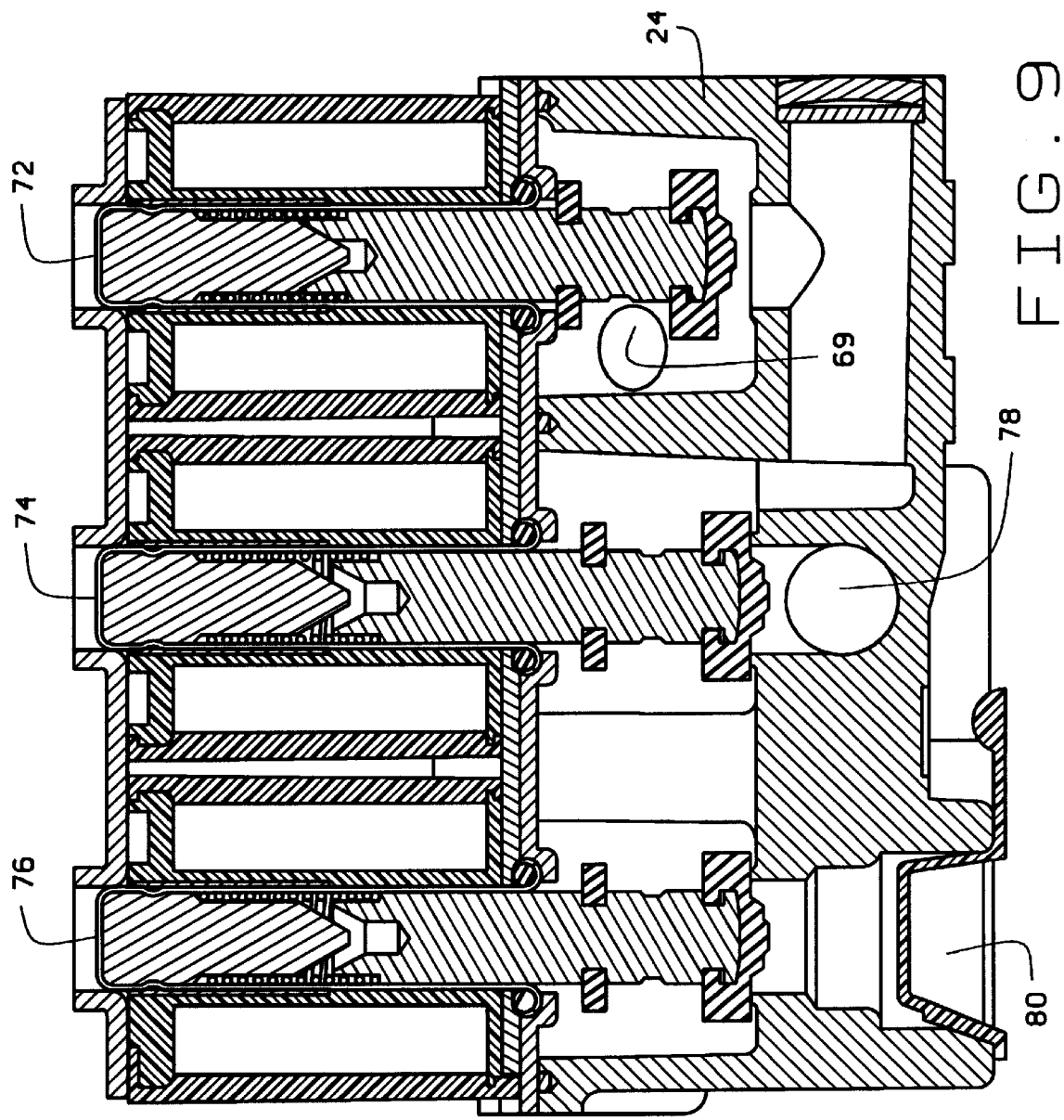
FIG. 9 is a vertical cross-sectional view of the gas valve section of the gas valve unit, taken along the plane of line 9—9 in FIG. 4.

As shown in FIG. 8B, the link 64 comprises a generally circular disk 66, having a generally cylindrical sidewall 68 extending from the disk 66. A raised annular bead 70 extends around the circumference of the cylindrical sidewall 68, that frictionally engages the interior of the cylindrical wall 50 of the vent cap 46. The adjustable fluid flow regulator 22 delivers gas to the outlet 32 and to the gas valve section 24 through a passageway 69 (FIG. 9) leading from chamber 28 to the valve section. The gas valve section 24 has three solenoids 72, 74, and 76. Each of the solenoids 72, 74, and 76 operate a valve. The first solenoid 72 operates a valve that delivers gas from chamber 28 to the other valves in the valve section 24. The second solenoid 74 operates a valve that delivers gas to an outlet 78 (FIG. 2), and the third solenoid 76 operates a valve that delivers gas to outlet 80 (FIG. 6). As shown in the Figures, the inlet 30, and the outlets 32, 78, and 80 are closed with removable plastic caps C that are put on at the time of manufacture to protect the valve unit until it is installed.

Operation

In operation the unit 20 is, for example, connected to a supply of natural gas and the outlets 32, 78, and 80 are connected to the cook top burners, the oven burner, and the broiler burner, respectively. As the pressure in the chamber 28 varies, the diaphragm 40 flexes, moving the valve stem 38 relative to the valve seat 36 to open and close the valve 34, thereby regulating fluid flow between the inlet 30 and the outlets 32, 78, and 80. The first spring 42 acts upon the diaphragm 40 to control the operating pressure of the valve 34.

If it were desired to convert the valve unit 20 for operation with L.P. gas, then the hollow vent cap 46 would be removed, and the link 64 would be installed in the bottom 52 of the vent cap. The bead 70 on the sidewall 68 frictionally engages the inside of the sidewall 50 of the vent cap 46 to hold the link 64 in place. The vent cap 46 is then replaced in the passage 44. The link 64 engages the second end 62 of the second spring 58, so that the second spring applies a biasing force to the diaphragm 40. Thus in the L.P. gas mode, both the first spring 42 and the second spring 58 act upon the diaphragm to control the operating pressure of the valve.

The use of the link 64 provides a fast, easy, positive conversion between the natural gas and L.P. gas modes. Unlike other adjustable regulators, there is no switch or lever that can be inadvertently moved, or a reversible cap that can be installed incorrectly. A label can be provided with the link to secure on the top of the vent cap to clearly indicate that the valve unit 20 has been adapted for use with L.P. gas.

What is claimed is:

1. An adjustable fluid flow regulator for selectively regulating the flow of fluid at two different pressures, the regulator comprising a casing having a chamber therein, an inlet and an outlet communicating with the chamber, a valve for controlling fluid flow between the inlet and the outlet, a flexible diaphragm in the casing, connected to the valve, for operating the valve in response to pressure changes in the chamber; a removable hollow cap; a removable link adapted to fit in the hollow cap, and a spring for selectively applying biasing pressure against the diaphragm, the spring engaging the link to apply a biasing force against the diaphragm when the link is in the cap, and the spring extending into the cap when the link is not in the cap.

2. The adjustable fluid flow regulator according to claim 1 wherein the cap has an open bottom, and wherein the link comprises a disk having a generally cylindrical sidewall adapted to fit in the open bottom of the cap.

3. An adjustable fluid flow regulator for selectively regulating the flow of fluid at two different pressures, the regulator comprising a casing having a chamber therein, an inlet and an outlet communicating with the chamber, a valve for controlling fluid flow between the inlet and the outlet, a flexible diaphragm in the casing, connected to the valve, for operating the valve in response to pressure changes in the chamber; a removable hollow cap having an open bottom; a removable link adapted to fit in the hollow cap, the link comprising a disk having a generally cylindrical sidewall adapted to fit in the open bottom of the cap having a raised bead on the cylindrical sidewall of the link for frictionally engaging the cap, and a spring for selectively applying biasing pressure against the diaphragm, the spring engaging the link to apply a biasing force against the diaphragm when the link is in the cap, and the spring extending into the cap when the link is not in the cap.

4. An improved adjustable fluid flow regulator for selectively regulating the flow of fluid at two different pressures, the regulator of the type comprising a casing having a chamber therein, an inlet and an outlet communicating with the chamber, a valve for controlling fluid flow between the inlet and the outlet, a flexible diaphragm in the casing and connected to the valve for operating the valve in response to pressure changes in the chamber; and a spring for selectively applying a biasing pressure to the diaphragm, the improvement comprising a removable hollow cap in the casing aligned with the spring, and a link adapted to be installed in the hollow cap, the spring extending into the hollow cap when the link is not in the cap so that the diaphragm is biased with a first force, and the spring engaging the link when the link is in the cap to apply a biasing force, greater than the first force, against the diaphragm.

5. The improved adjustable fluid flow regulator according to claim 4 wherein the link comprises a disk having a cylindrical sidewall adapted to fit in the open bottom of the cap.

6. An improved adjustable fluid flow regulator for selectively regulating the flow of fluid at two different pressures, the regulator of the type comprising a casing having a chamber therein, an inlet and an outlet communicating with the chamber, a valve for controlling fluid flow between the inlet and the outlet, a flexible diaphragm in the casing and connected to the valve for operating the valve in response to pressure changes in the chamber; and a spring for selectively applying a biasing pressure to the diaphragm, the improvement comprising a removable hollow cap in the casing aligned with the spring, and a link adapted to be installed in the hollow cap, the link comprising a disk having a cylindrical sidewall adapted to fit in the open bottom of the cap, the link having a raised bead on the cylindrical sidewall of the link for frictionally engaging the cap, the spring extending into the hollow cap when the link is not in the cap so that the diaphragm is biased with a first force, and the spring engaging the link when the link is in the cap to apply a biasing force, greater than the first force, against the diaphragm.

7. A method of adjusting a fluid flow regulator from operation at a first pressure to operation at a second pressure, the fluid flow regulator of the type comprising a casing having a chamber therein, an inlet and an outlet communicating with the chamber, a valve for controlling fluid flow between the inlet and the outlet, a flexible diaphragm in the casing and connected to the valve for operating the valve in response to pressure changes in the chamber, a spring for selectively applying a biasing pressure against the diaphragm to change the operating pressure of the fluid flow regulator, and a removable hollow cap aligned with the spring, the method comprising the step of removing the cap; inserting a removable link in the cap; replacing the cap so that the link engages the spring so that the spring applies a biasing force against the diaphragm that is greater than when the link is not in the cap.

8. The method according to claim 7 wherein the link comprises a disk having a cylindrical sidewall adapted to fit in the open bottom of the cap.

9. A method of adjusting a fluid flow regulator from operation at a first pressure to operation at a second pressure, the fluid flow regulator of the type comprising a casing having a chamber therein, an inlet and an outlet communicating with the chamber, a valve for controlling fluid flow between the inlet and the outlet, a flexible diaphragm in the casing and connected to the valve for operating the valve in response to pressure changes in the chamber, a spring for selectively applying a biasing pressure against the diaphragm to change the operating pressure of the fluid flow regulator, and a removable hollow cap aligned with the spring, the method comprising the step of removing the cap; inserting a removable link in the cap, the link comprising a disk having a cylindrical sidewall adapted to fit in the open bottom of the cap, the link having a raised bead on the cylindrical sidewall of the link for frictionally engaging the cap; replacing the cap so that the link engages the spring so that the spring applies a biasing force against the diaphragm that is greater than when the link is not in the cap.

10. A method of adjusting a fluid flow regulator from operation at a first pressure to operation at a second pressure, the fluid regulator of the type comprising a casing having a chamber therein, an inlet and an outlet communicating with the chamber, a valve for controlling fluid flow between the inlet and the outlet, a flexible diaphragm in the casing and connected to the valve for operating the valve in response to pressure changes in the chamber, a spring for selectively applying a biasing pressure against the diaphragm to change the operating pressure of the regulator, and a removable hollow cap aligned with the spring, the hollow cap having a removable link therein for engage the spring and applying a biasing pressure to the diaphragm, the method comprising the steps of removing the cap; removing the removable link in the cap; replacing the cap so that the spring extends into the hollow cap to apply a lesser force then when the removable link was in the cap.

11. The method according to claim 10 wherein the link comprises a disk having a cylindrical sidewall adapted to fit in the open bottom of the cap.

12. A method of adjusting a fluid flow regulator from operation at a first pressure to operation at a second pressure, the fluid regulator of the type comprising a casing having a chamber therein, an inlet and an outlet communicating with the chamber, a valve for controlling fluid flow between the inlet and the outlet, a flexible diaphragm in the casing and connected to the valve for operating the valve in response to pressure changes in the chamber, a spring for selectively applying a biasing pressure against the diaphragm to change the operating pressure of the regulator, and a removable hollow cap aligned with the spring, the hollow cap having a removable link therein for engaging the spring and applying a biasing pressure to the diaphragm, the link comprising a disk having a disk having a cylindrical sidewall adapted to fit in the open bottom of the cap, the sidewall having a raised bead on the cylindrical sidewall of the link for frictionally engaging the cap, the method comprising the steps of removing the cap; removing the removable link in the cap, replacing the cap so that the spring extends into the hollow cap to apply a lesser force then when the removable link was in the cap.

13. A method of adjusting a fluid regulator from operation at a first pressure to operation at a second pressure, the fluid regulator of the type comprising a casing having a chamber therein, an inlet and an outlet communicating with the chamber, a valve for controlling fluid flow between the inlet and the outlet, a flexible diaphragm in the casing and connected to the valve for operating the valve in response to pressure changes in the chamber, and a spring, a removable hollow cap aligned with the spring, and a removable link adapted to fit in the removable hollow cap for selectively applying a biasing pressure against the diaphragm to change the operating pressure of the fluid flow regulator, the method comprising the step of removing the cap; inserting the removable link into, or removing the removable link from, the cap; replacing the cap to change the biasing force the spring applies against the diaphragm.

14. An adjustable fluid flow regulator that can be adjusted for operating at two different operating pressures, the regulator comprising a casing having a chamber therein, an inlet and an outlet communicating with the chamber, a valve for controlling fluid flow between the inlet and the outlet, a flexible diaphragm in the casing and connected to the valve for operating the valve in response to pressure changes in the chamber, a spring, a removable hollow cap aligned with the spring, and a link adapted to fit in the cap, the link comprising a disk having a cylindrical sidewall adapted to fit in the open bottom of the cap and a raised bead on the cylindrical sidewall of the link for frictionally engaging the cap, the link when installed in the cap, engaging the spring to cause the spring to apply a biasing force against the diaphragm that is higher than when the link is not in the cap.

15. An adjustable fluid flow regulator for selectively regulating fluids at two different pressures, the regulator comprising a casing having a chamber therein, an inlet and an outlet communicating with the chamber, a valve for controlling fluid flow between the inlet and the outlet, a flexible diaphragm in the casing and connected to the valve for operating the valve in response to pressure changes in the chamber; a removable hollow cap; a spring for selectively applying biasing pressure against the diaphragm, the spring aligned with the removable hollow cap; and a removable link adapted to fit in the hollow cap, and which when fit in the hollow cap engages the spring to apply force against the diaphragm.

16. The adjustable fluid flow regulator according to claim 15 wherein the link comprises a disk having a cylindrical sidewall adapted to fit in the open bottom of the cap.

* * * * *